UNITED STATES PATENT OFFICE.

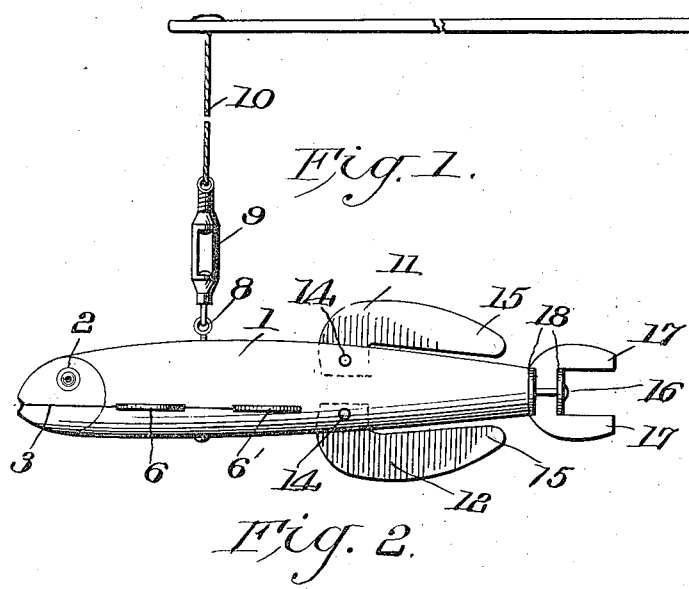

EDGAR C. TOWNSEND, OF RUTLEDGE, MINNESOTA.

DECOY-MINNOW.

1,188,583.

Specification of Letters Patent.

Patented June 27, 1916.

Application filed May 26, 1913. Serial No. 769,838.

*To all whom it may concern:*

Be it known that I, EDGAR C. TOWNSEND, a citizen of the United States, and a resident of Rutledge, in the county of Pine and State of Minnesota, have invented certain new and useful Improvements in Decoy-Minnows, of which the following is a specification, reference being had to the accompanying drawings.

This invention relates to decoy minnows and one of the principal objects of the invention is to provide a simple and efficient decoy which will move in a circular path when raised and lowered in the water and which will simulate a live minnow to attract fish in its vicinity so that the fish may be speared by a fisherman standing upon the ice.

Another object of the invention is to provide a decoy minnow which may be made in any desired shape and color to simulate any particular species of fish and which when connected to a line and operated by a fisherman to raise and lower the line, the minnow will take a circular course either to the right or left, said decoy minnow being designed to attract game fish when said decoy is properly manipulated by the fisherman standing on the ice near the fishing hole.

These and other objects may be attained by means of the construction illustrated in the accompanying drawing, in which:

Figure 1 is a side elevation of a decoy minnow made in accordance with my invention; Fig. 2 is a central vertical longitudinal section of the same; Fig. 3 is a bottom plan view of the same.

Referring to the drawing the numeral 1 designates the body portion of the minnow which may be made of wood or other suitable material and may be of the required shape to simulate a sun fish, a shiner, pike, small pickerel or any other species of fish, the body being colored or treated to give the desired appearance. The body of the fish is preferably provided with shining glass eyes 2. A slit or kerf 3 is formed transversely of the body portion of the fish and a suitable balancing weight of lead or other material 4 is connected to the body portion 1 by suitable fastenings 5. Oppositely positioned front and rear metal pectoral fins 6 and 6' are secured to the body 1 in alined spaced relation by means of the fastenings 5 which pass through the weight 4 and into the body portion 1. These fins 6 and 6' are designed for the purpose of giving stability to the minnow and for preventing it tipping over from one side to the other. A pin 7 extends through the body of the minnow and through the weight 4, said pin at its upper end having an eye 8 for the attachment of a swivel 9, to which is connected a line 10. The superposed rearwardly directed dorsal and anal fins 11 and 12, which are located to the rear of the rear pectoral fin 6', are each provided with a lug 13 extending into an aperture in the top and bottom of the minnow, said fins being connected to said body portion by means of pins 14. The fins 11 and 12 are free from the body of the minnow at their rear portions and may be bent to one side or the other to give the fish a circular motion when the line 10 is raised and lowered as will be understood, and it will be obvious that by bending the terminal portions 15 in one direction or the other, the minnow may be made to assume a circular course in either direction to the right or to the left.

Secured to the rear end of the minnow and mounted to rotate eccentrically on the pin 16 is a tail comprising a plurality of blades 17 and angularly and laterally extending attaching ears 18.

This decoy minnow is designed to be manipulated by means of a short handle to which the line 10 is connected.

My invention is designed to be used in fishing for game fish by cutting a hole in the ice and letting the decoy minnow down a certain distance under the water and by moving the handle up and down the decoy minnow takes a circular course and the tail is rotated to simulate a moving minnow. When a game fish is attracted to the minnow the decoy is suddenly pulled out of the fishing hole to give the fisherman a chance to spear the game fish.

From the foregoing, it will be obvious that a decoy minnow made in accordance with my invention can be used to advantage in fishing for game fish through the ice and when properly manipulated will not fail to attract the fish to induce them to go sufficiently near for the spearman to catch them.

I claim:

A decoy minnow comprising a body portion, oppositely positioned front and rear pectoral fins extending from said body in alined spaced relation, superposed rearwardly directed dorsal and anal fins extending from said body to the rear of said rear pectoral fins, the rear ends of said dorsal and anal fins being free from the body of the minnow so that their rear portions may be bent to one side or the other, a pin extending from the rear end of said body, a tail comprising two blades and having laterally directed ears said ears being revolubly held upon said pin whereby said tail is eccentrically held, a balancing weight secured to the forward under portion of said body, and a pin extending vertically through said body ending in an eye to receive a strand whereby said body will be held in a horizontal position, as and for the purpose set forth.

In testimony whereof I affix my signature, in the presence of two witnesses.

EDGAR C. TOWNSEND.

Witnesses:
LUDWIG WESTRUD,
JOHN PRAZMA.